United States Patent
MacNeille et al.

(10) Patent No.: US 9,122,567 B2
(45) Date of Patent: Sep. 1, 2015

(54) USER INTERFACE SYSTEM AND METHOD

(71) Applicant: Ford Global Technologies, LLC, Dearborn, MI (US)

(72) Inventors: Perry Robinson MacNeille, Lathrup Village, MI (US); Michael Edward Loftus, Northville, MI (US); John Proietty, Ferndale, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 21 days.

(21) Appl. No.: 13/828,908

(22) Filed: Mar. 14, 2013

(65) Prior Publication Data

US 2014/0277872 A1   Sep. 18, 2014

(51) Int. Cl.
| | |
|---|---|
| B60L 9/00 | (2006.01) |
| B60L 11/00 | (2006.01) |
| G05D 1/00 | (2006.01) |
| G05D 3/00 | (2006.01) |
| G06F 7/00 | (2006.01) |
| G06F 17/00 | (2006.01) |
| G01C 21/34 | (2006.01) |

(52) U.S. Cl.
CPC ............ *G06F 17/00* (2013.01); *G01C 21/3415* (2013.01); *Y02T 10/7005* (2013.01)

(58) Field of Classification Search
CPC ... B60W 20/00; B60W 10/08; G01C 21/3469
USPC .......................................................... 701/22
See application file for complete search history.

(56) References Cited

U.S. PATENT DOCUMENTS

| | | |
|---|---|---|
| 5,352,982 A | 10/1994 | Nakazawa et al. |
| 6,687,607 B2 | 2/2004 | Graf et al. |
| 7,521,935 B2 | 4/2009 | Uchida |
| 2005/0107951 A1 | 5/2005 | Brulle-Drews et al. |
| 2008/0275644 A1 | 11/2008 | Macneille et al. |
| 2010/0250059 A1 | 9/2010 | Sekiyama et al. |
| 2011/0077854 A1 | 3/2011 | Fushiki et al. |
| 2011/0106419 A1 | 5/2011 | Kim |
| 2011/0112710 A1 | 5/2011 | Meyer-Ebeling et al. |
| 2011/0202221 A1 | 8/2011 | Sobue et al. |
| 2011/0224900 A1 | 9/2011 | Hiruta et al. |
| 2011/0225105 A1 | 9/2011 | Scholer et al. |
| 2011/0246004 A1* | 10/2011 | Mineta ............................ 701/22 |

FOREIGN PATENT DOCUMENTS

WO      2010073053 A1    7/2010

* cited by examiner

*Primary Examiner* — Maceeh Anwari
(74) *Attorney, Agent, or Firm* — Jennifer M. Stec; Brooks Kushman P.C.

(57) ABSTRACT

A system and method for controlling an electric-vehicle is provided. The system and method calculates a likelihood of arriving at a destination based on vehicle data and a current route. The likelihood is compared to least a first threshold and a second threshold. A first action is implemented when the likelihood is less than the first threshold and greater than the second threshold. A second action being different from the first action is implemented when the likelihood is less than the second threshold.

17 Claims, 2 Drawing Sheets

USER INTERFACE SYSTEM AND METHOD

TECHNICAL FIELD

The present disclosure relates to a user interface system and method for based on a battery condition in an electric vehicle.

BACKGROUND

All vehicles, whether passenger or commercial, include a number of gauges, indicators, and various other displays to provide the vehicle operator with information regarding the vehicle and its surroundings. With the advent of new technologies, such as hybrid electric vehicles (HEVs), plug-in hybrid electric vehicle (PHEVs) and battery electric vehicles (BEVs), has come a variety of new gauges and information displays that help guide drivers to better learn, understand and trust the operation of these vehicles that utilize new technology. For example, many HEVs incorporate gauges that attempt to provide the driver with information on the various hybrid driving states. Some gauges will indicate to the driver when the vehicle is being propelled by the engine alone, the motor alone, or a combination of the two. Similarly, a display may indicate when the motor is operating as a generator, and is recharging an energy storage device, such as a battery.

It is known that some drivers may not be able to achieve desired fuel economy or energy efficiency numbers, in part because of driving habits. In many cases, drivers are willing to modify their behavior, but are unable to translate recommended techniques into real changes in their driving habits. With the increase in sensing electronics, computers and other related technology on board a vehicle, the amount of information that can be communicated to the driver is virtually limitless. Often, the driver may not even know of all the features and capabilities their vehicle has to offer. Utilizing human-machine interfaces (HMI) to convey or display certain types of information, particularly information relevant to HEVs, PHEVs or BEVs, can help facilitate economical driving choices.

SUMMARY

According to one or more embodiments of the present disclosure, an interface system for an electric vehicle is provided. The system includes an interface for communicating with a vehicle user. A controller is in communication with the interface and configured to receive input indicative of a destination. A likelihood of arriving at the destination is calculated based on vehicle data and a present route. The likelihood of arriving is compared to least a first threshold and a second threshold. A first action is implemented when the likelihood of arriving is less than at the first threshold and greater than the second threshold. A second action, different from the first action, is implemented when the likelihood of arriving is less than the second threshold.

In another embodiment, the first action includes communicating an advisory action via the interface to be executed by the driver. The second action includes the controller being configured to automatically adjust at least one vehicle operating parameter to reduce energy consumption.

In a further embodiment, the first action includes communicating an advisory action message via the interface to be executed by the driver. The advisory action message advises the user to take an alternate route including at least one of a more direct route and a least-energy route.

In still another embodiment, the second action includes automatically adjusting at least one vehicle operating parameter to reduce energy consumption.

In yet another embodiment, the controller is further configured to implement a third action being different from the first and second actions, when the likelihood of arriving is less than a third threshold. The third action is automatically executed by the controller.

According to one or more other embodiments of the present disclosure, an electric vehicle system is provided. The system includes a controller configured to calculate a likelihood of arriving at a destination based on vehicle data and a current route. The likelihood is compared to least a first threshold and a second threshold. A first action is implemented when the likelihood is less than the first threshold and greater than the second threshold. A second action being different from the first action is implemented when the likelihood is less than the second threshold.

According to one or more other embodiments of the present disclosure, a method for controlling an electric-vehicle is provided. The method calculates a likelihood of arriving at a destination based on vehicle data and a current route. The likelihood is compared to least a first threshold and a second threshold. A first action is implemented when the likelihood is less than the first threshold and greater than the second threshold. A second action being different from the first action is implemented when the likelihood is less than the second threshold.

DETAILED DESCRIPTION

As required, detailed embodiments of the present disclosure are disclosed herein; however, it is to be understood that the disclosed embodiments are merely examples of an invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ one or more embodiments of the present application.

Figure 1:
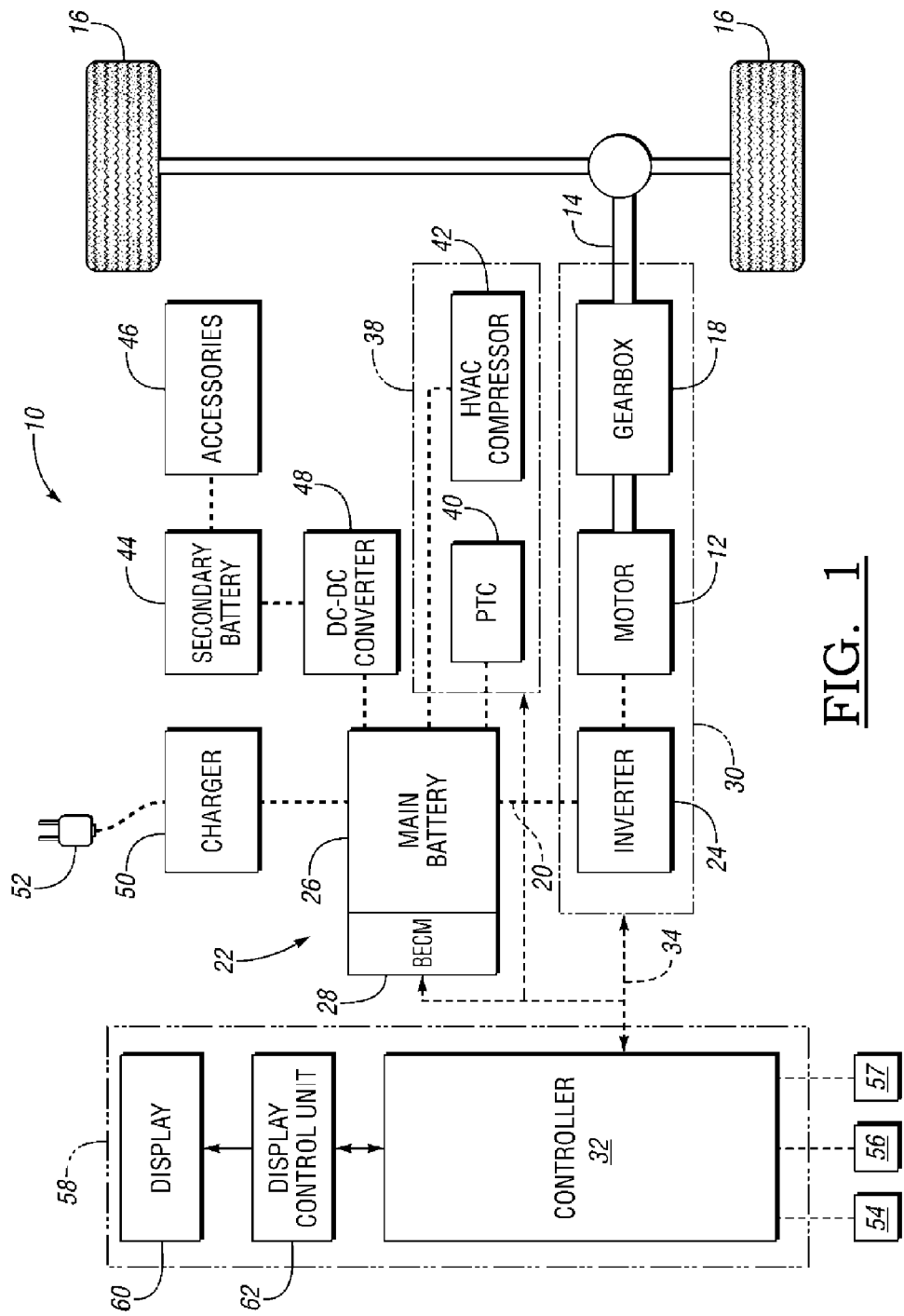
FIG. 1 is a simplified, exemplary schematic representation of a vehicle including an information display system according to one or more embodiments of the present disclosure.

Referring now to the drawings, FIG. 1 is a simplified, exemplary schematic representation of a vehicle 10 is illustrated. As seen therein, the vehicle 10 may be a battery electric vehicle (BEV), which is an all-electric vehicle propelled by one or more electric machines without assistance from an internal combustion engine. The one or more electric machines of the vehicle 10 may include a traction motor 12. The motor 12 may output torque to a shaft 14, which may be connected to a first set of vehicle drive wheels, or primary drive wheels 16, through a gearbox 18. Other vehicles within the scope of the present disclosure may have different electric machine arrangements, such as more than one traction motor. In the embodiment shown in FIG. 1, the traction motor 12 can be used as a motor to output torque to propel the vehicle 10. Alternatively, the motor 12 can also be used as a generator, outputting electrical power to a high voltage bus 20 and to an energy storage system 22 through an inverter 24.

The energy storage system 22 may include a main battery 26 and a battery energy control module (BECM) 28. The main battery 26 may be a high voltage battery that is capable of outputting electrical power to operate the motor 12. According to one or more embodiments, the main battery 26 may be a battery pack made up of several battery modules. Each battery module may contain a plurality of battery cells. The battery cells may be air cooled using existing vehicle cabin air. The battery cells may also be heated or cooled using a fluid coolant system. The BECM 28 may act as a controller for the main battery 26. The BECM 28 may also include an electronic monitoring system that manages temperature and state of charge of each of the battery cells. Other types of energy storage systems can be used with a vehicle, such as the vehicle 10. For example, a device such as a capacitor can be used, which, like a high voltage battery, is capable of both storing and outputting electrical energy. Alternatively, a device such as a fuel cell may be used in conjunction with a battery and/or capacitor to provide electrical power for the vehicle 10.

As shown in FIG. 1, the motor 12, the gearbox 18, and the inverter 24 may generally be referred to as a transmission 30. To control the components of the transmission 30, a vehicle control system, shown generally as a vehicle controller 32, may be provided. Although it is shown as a single controller, it may include multiple controllers that may be used to control multiple vehicle systems. For example, the controller 32 may be a vehicle system controller (VSC) or powertrain control module (PCM). In this regard, the PCM portion of the may be software embedded within the VSC, or it can be a separate hardware device.

A controller area network (CAN) 34 may allow the controller 32 to communicate with the transmission 30 and the BECM 28. Just as the main battery 26 includes a BECM, other devices controlled by the controller 32 may have their own controllers or sub-controllers. For example, the transmission 30 may include a transmission control module (TCM) (not shown), configured to coordinate control of specific components within the transmission 30, such as the motor 12 and/or the inverter 24. For instance, the TCM may include a motor controller. The motor controller may monitor, among other things, the position, speed, power consumption and temperature of the motor 12. Using this information and a throttle command by the driver, the motor controller and the inverter 24 may convert the direct current (DC) voltage supply by the main battery 26 into signals that can be used to drive the motor 12. Some or all of these various controllers can make up a control system, which, for reference purposes, may be the controller 32.

Although illustrated and described in the context of the vehicle 10, which is a BEV, it is understood that embodiments of the present disclosure may be implemented on other types of vehicles, such as those powered by an internal combustion engine, either alone or in addition to one or more electric machines (e.g., HEVs, PHEVs, etc.).

The vehicle 10 may also include a climate control system 38. The climate control system 38 may include both heating and cooling components. For instance, the climate control system 38 may include a high voltage positive temperature coefficient (PTC) electric heater 40. The PTC 40 may be used to heat coolant that circulates to a passenger car heater. Heat from the PTC 40 may also be circulated to the main battery 26. The climate control system 38 may also include a high voltage electric HVAC compressor 42. Both the PTC 40 and the HVAC compressor 42 may draw electrical energy directly from the main battery 26. Moreover, the climate control system 38 may communicate with the controller 32. The on/off status of the climate control system 38 can be communicated to the controller 32, and can be based on, for example, the status of an operator actuated switch, or the automatic control of the climate control system 38 based on related functions such as window defrost.

In addition to the main battery 26, the vehicle 10 may include a separate, secondary battery 44, such as a typical 12-volt battery. The secondary battery 44 may be used to power various other vehicle accessories 46, such as headlights, and the like. A DC-to-DC converter 48 may be electrically interposed between the main battery 26 and the secondary battery 44. The DC-to-DC converter 48 may allow the main battery 26 to charge the secondary battery 44.

The vehicle 10, which is shown as a BEV, may further include an alternating current (AC) charger 50 for charging the main battery 26 using an off-vehicle AC source. The AC charger 50 may include power electronics used to convert the off-vehicle AC source from an electrical power grid to the DC voltage required by the main battery 26, thereby charging the main battery 26 to its full state of charge. The AC charger 50 may be able to accommodate one or more conventional voltage sources from an off-vehicle electrical grid (e.g., 110 volt, 220 volt, etc.). The AC charger 50 may be connected to the off-vehicle electrical grid using an adaptor, shown schematically in FIG. 1 as a plug 52.

Also shown in FIG. 1 are simplified schematic representations of a braking system 54, an acceleration system 56, and a navigation system 57. The braking system 54 may include such things as a brake pedal, position sensors, pressure sensors, or some combination of the two, as well as a mechanical connection to the vehicle wheels, such as the primary drive wheels 16, to effect friction braking. The braking system 54 may also include a regenerative braking system, wherein braking energy may be captured and stored as electrical energy in the main battery 26. Similarly, the acceleration system 56 may include an accelerator pedal having one or more sensors, which, like the sensors in the braking system 54, may communicate information such as throttle input to the controller 32.

The navigation system 57 may include a global positioning system (GPS) unit and a navigation user interface. The navigation user interface may include a navigation display and a navigation controller and inputs for receiving destination information or other data from a driver. The navigation system 57 may also communicate distance and/or location information associated with the vehicle 10, the vehicle's target destinations, or other relevant GPS waypoints. The controller 32 may communicate with each individual vehicle system to monitor and control vehicle operation according to programmed algorithms and control logic. In this regard, the controller 32 may help manage the different energy sources available and the mechanical power being delivered to the wheels 16 in order to maximize the vehicle's range. The controller 32 may also communicate with a driver as well.

In addition to the foregoing, the vehicle 10 may include an information interface system 58 to facilitate communications with a driver. As explained in detail below, the information interface system 58 may provide relevant vehicle content to a driver of the vehicle 10 before, during or after operation. As shown in FIG. 1, the information interface system 58 may include the controller 32 and an information display 60. The information interface system 58 may also include its own control system, which, for reference purposes, may be a display control unit 62. The display control unit 62 may communicate with the controller 32 and may perform control functions on the information display 60, although the controller 32 may also function as the information interface system 58.

The controller 32 may be configured to receive input that relates to current operating conditions of the vehicle 10. For instance, the controller 32 may receive input signals from the BECM 28, the transmission 30 (e.g., motor 12 and/or inverter 24), the climate control system 38, the braking system 54, the acceleration system 56, or the like. The controller 32 may provide output to the display control unit 62 such that the information display 60 conveys energy consumption and range information, or other information relating to the operation of the vehicle 10 to a driver.

The information display 60 may be disposed within a dashboard of the vehicle 10, such as an instrument panel or center console area. Moreover, the information display 60 may be part of another display system, such as the navigation system 57, or may be part of a dedicated information display system. The information display 60 may be a liquid crystal display (LCD), a plasma display, an organic light emitting display (OLED), or any other suitable display.

The information display 60 may include a touch screen interface for receiving driver input associated with selected areas of the information display 60. The information interface system 58 may also include one or more buttons, including hard keys or soft keys, located adjacent the information display 60 for effectuating driver input. The information interface system 58 may also include a voice recognition system for receiving voice inputs from the users through various microphones, for example. In addition, the information interface system 58 may include an audio system for relating audio information to the users. Other operator inputs known to one of ordinary skill in the art may also be employed without departing from the scope of the present disclosure.

Figure 2:
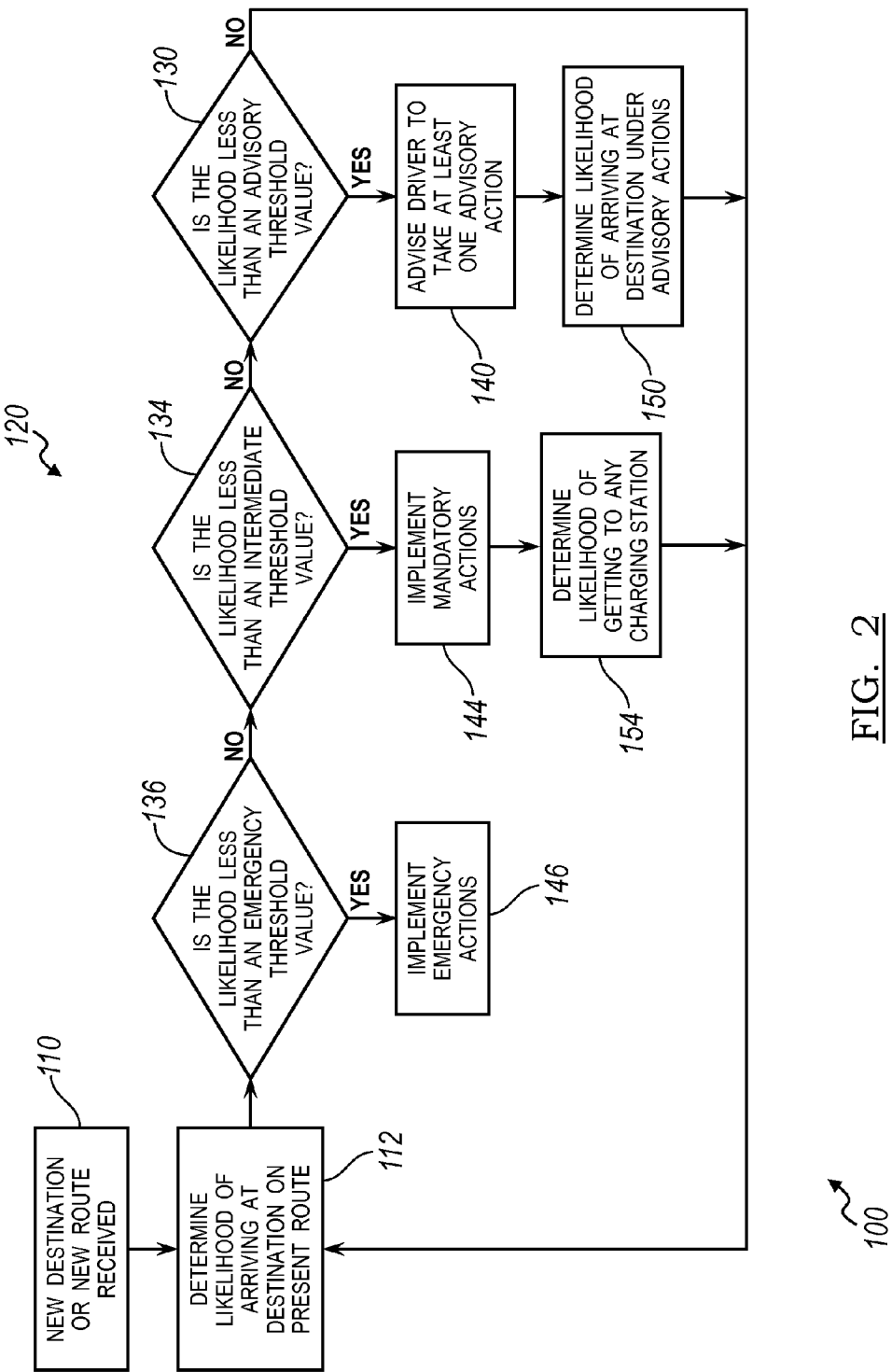
FIG. 2 is a simplified, exemplary flow chart depicting a method according to one or more embodiments of the present disclosure.

Referring to FIG. 2 is a flowchart illustration for assisting the driver to prevent being stranded because the battery 26 has discharged while driving. BEVs have several disadvantages with respect to conventional vehicles. For example, BEVs may have a limited range or distance that can be traveled before the main battery 26 is depleted. Charging takes a long time compared to fueling in a conventional vehicle. In addition, BEV charging locations are scarce at the present time. Also, the range of electric vehicles is substantially affected by externalities such as weather and road gradient, for example. Because of these fundamental disadvantages, vehicle features and user interfaces for a BEV are needed to minimize anxiety users of BEVs and prevent the potential of becoming stranded.

Some BEV user interfaces display the remaining travel distance, similar to a fuel gauge, on a dashboard display. The display is dynamic in that it continues to update the BEV's range estimate. A fundamental problem with this approach is that the driver may not know how far it is to the destination. Also, the calculation of the range can change dramatically while underway because it is based on historical energy consumption data and not on the factors that directly influence range. Therefore, this type of gauge or display may indicate there is enough remaining range to get to the destination, but then will suddenly drop and the driver is left stranded.

The present disclosure is provides a system and method that informs the driver whether or not the vehicle can make it to the next destination/charger on the energy remaining in the battery.

Accordingly, the range of a vehicle may also be referred to as its distance to empty (DTE) value. The DTE value is calculated based on a variety of factors and algorithms based on several different engineering disciplines. Unlike a conventional vehicle and a fuel gauge, the BEV's distance to empty calculation can be drastically affected by traffic, weather, terrain, or driving style, for example, and it more difficult for a driver to estimate the DTE value.

FIG. 2 illustrates a strategy 100 for assisting the driver to prevent being stranded because the battery 26 has discharged while driving. The method 100 can be initiated when the controller 32 receives a new destination, or a new route, as represented by block 110. Destination information may be manually input by the user via the vehicle interface 58. Similarly, the controller 32 can automatically receiving destination based on a calendar event or itinerary from a user's electronic device such as a mobile phone, smart phone, PDA or any wireless device with network connectivity and having electronic calendar function. The personal electronic device may communicate with the controller 32 via a wireless remote network, such as Bluetooth, optical, or any suitable communication network. The electronic device may also be connected physically to the controller 32 through a USB connector or physical data port, for example. If the personal device includes an electronic calendar, the controller 32 is able to access the driver's calendar events and itinerary automatically. As such, the controller 32 may obtain the destination information from the electronic device. The method 100 is also initiated if the controller 32 detects a new route. For example, if the driver makes a wrong turn or deviates from the intended route, the controller 32 receives the new route and destination information, as represented by block 110.

Based on the destination or route in block 110, the controller determines a likelihood of arriving at the destination on the present route, as represented by block 112. The controller uses data fitting algorithms and vehicle routing algorithms to determine the likelihood of reaching the destination. In one embodiment, the calculation uses one of the several solutions to the Resource Constrained Elementary Shortest Path Problem (RCESPP) to calculate a percentage certainty the vehicle will reach a particular destination. Numerous factors are evaluated in order to calculate the likelihood of arriving at the destination. Obtaining this information requires connection to on-board vehicle networks and off-board wireless networks.

For example, the controller 32 may determine the driver profile. How the vehicle 10 is driven can be an important factor in determining how long the remaining charge in the main battery 26 will last. For instance, aggressive driving behavior may deplete the main battery 26 more rapidly than relatively conservative driving behavior. To this end, the operation of the vehicle 10 may be continuously monitored and analyzed in order to determine the impact of driving behavior on the vehicle's range. The controller 32 may take into account past driving behavior, current driving behavior, or predicted future driving behavior.

The driver profile may correspond to a theoretical or global average for all types of drivers. The driver profile may also be estimated to correspond to an average for the vehicle 10. The vehicle's average profile may correspond to a lifetime average or an average for a past distance traveled, period of time or some other relevant event.

In another embodiment each driver of the vehicle 10 may be assigned a key ID identifying a driver profile to the controller 32. This may allow driver preferences, setting or other profile information, such as an average energy consumption profile, to be stored and recalled for each driver. The key ID may be input to the vehicle either actively or passively at startup. For example, each driver may manually enter a code associated with their key ID. Alternatively, the key ID may be automatically transmitted to the controller 32 using radio frequency (RF) technology. In particular, the key ID may be an RFID stored in a driver's key or key fob that, when interrogated, transmits the driver's ID to the controller 32.

The controller 32 may also take into account environmental factors such as topography, weather or traffic, for example. The controller 32 may receive the environmental data from numerous sources such as vehicle-to-vehicle communication networks, stored data, such as topographic map data, telecommunication networks, or broadcast networks to which the vehicle subscribes. Of course, any suitable method for receiving and/or looking up particular environmental data may be utilized. Given the vehicle position and the time of day, external information such as wind speed, solar flux, ambient temperature, traffic control, road grade, road length, as well as other environmental data may be obtained by the controller 32.

The controller 32 uses forecasts of the weather and traffic, as well as knowledge of the topography to estimate how far the remaining charge will take a vehicle along any specific route to the intended destination. Estimates of the accuracy of these forecasts can also be made using mathematical models of forecast accuracy. Further, the controller 32 may be able to receive estimates of the forecast data can also be made to represent, for example, turbulence of wind flows and variability in micro-traffic conditions.

Based on the environmental data, the controller algorithms calculate the energy-cost per unit of distance and/or time or the distance to empty (DTE). The energy cost may be determined from simulation or naturalistic studies, for example. The least energy route may be calculated based on a formula or algorithm that takes into account the numerous environmental factors that may affect that amount of energy required along a particular route. Several vehicle parameters may affect the DTE, Vehicle parameters such as the state of charge of the battery 26 or tire pressure and friction, vehicle weight, for example can be provided. The controller 32 may also obtain the battery performance characteristics and active charging or discharge rate or other relevant information regarding the vehicle. The vehicle parameters can be provided to the controller 32 by the vehicle through a vehicle network, or the vehicle information may be stored in a remote location such as on a remote server and be provided to the controller.

The energy-cost and DTE calculation may also account for available energy and potential losses based on the vehicle parameters. Available energy includes the stored energy in the battery. Potential losses may include frictional losses associated with tire pressure, aerodynamic resistance or energy losses from running accessories such as air conditioning.

An informational filter is used to select the data that is relevant to the area between the vehicle location and the driver's destination. The selected data is reduced to a fit function that estimates what future energy consumption and its statistical variation will be on any segment of road in the relevant area. The route to the destination is continually being calculated with a vehicle routing problem (VRP) solver in a process called dynamic routing. The range and the range expectation interval is computed in the VRP solver using the estimated energy costs and compared with the remaining energy in the battery computed from the state-of-charge and the state-of-health of the traction battery along the most energy efficient route to the destination. The VRP solver may also be used to compute the energy costs to nearby charging facilities.

Calculating the likelihood of arriving at the destination may use one of the several solutions to the Resource Constrained Elementary Shortest Path Problem (RCESPP) in which the cost function is the energy cost for driving each sub-path in the vicinity of the vehicle rather than distance or time. The cost function also provides a statistical prediction of the range, so it can be expressed in terms of the 90% expectancy range in which the calculation has a 90% certainty the vehicle will reach a particular destination. RCESPP is recalculated continuously to determine whether the destination/charger and other chargers are within a specific expectation/range.

The likelihood of arriving at the destination is evaluated in a tiered response system 120 having multiple threshold levels based on the severity of not reaching the destination. As illustrated in FIG. 2, three threshold levels of severity are presented, although any number of levels can be implemented in practice. As shown, the threshold levels include an advisory threshold level 130, a mandatory threshold level 134 and an emergency threshold level 136.

The controller 32 determines if the likelihood of arriving at the destination is less than the emergency threshold value, as represented by block 136. In one embodiment, the emergency threshold value may be a 10% likelihood of arriving at the destination. In another embodiment, the emergency value may be a 25% likelihood of arriving at the destination, or any suitable value.

If the likelihood of arriving at the destination is greater than the emergency threshold value, the controller 32 determines if the likelihood of arriving at the destination is less than an intermediate threshold value, as represented by block 134. In one embodiment, the intermediate threshold value may be a 50% likelihood of arriving at the destination. In another embodiment, the intermediate value may be a 70% likelihood of arriving at the destination, or any suitable value.

If the likelihood of arriving at the destination is greater than the intermediate threshold value, the controller 32 determines if the likelihood of arriving at the destination is less than an advisory threshold value, as represented by block 130. In one embodiment, the advisory threshold value may be a 90% likelihood of arriving at the destination. In another embodiment, the intermediate value may be a 80% likelihood of arriving at the destination, or any suitable value.

If the likelihood of arriving at the destination is less than the advisory threshold value, the controller 32 advises the driver to take at least one advisory action, as represented by block 140. During the advisory severity level, the controller 32 interacts with the driver through the interface 58 to advise or prompt the driver to voluntarily take the necessary steps to reduce energy consumption to reach the destination. Advisory actions may include taking a more energy efficient route or more direct route, even if it the alternative route less desirable or takes more time. Other advisory actions may include reducing the climate control even if it is less comfortable, and/or driving more slowly even if it takes longer.

If the likelihood of arriving at the destination is also less than the intermediate threshold value, the controller 32 automatically implements at least one mandatory action, as represented by block 144. In the mandatory severity level, the controller 32 takes necessary action to preemptively avoid the vehicle being stranded. For example, the controller 32 may reduce the maximum speed of the vehicle or reduce accessory levels. For example, the controller may automatically reduce or shutdown vehicle heating and cooling function. In the mandatory severity level, the controller 32 may only show routes that avoid barriers such as hills that the vehicle may not be able to successfully scale with the remaining energy. It may also instantiate a charging station reservation system at high priority and re-route the driver to the charging station destination.

If the likelihood of arriving at the destination is also less than the emergency threshold value, the controller 32 automatically implements at least one emergency action, as represented by block 146. During the emergency severity level, the controller has determined it is very unlikely the vehicle can get to any charging station. The emergency actions may reroute the vehicle to a safe, convenient locate to stop. Emergency actions may also include automatically notifying and selection potential rescuers and reroute the vehicle to a location to meet rescuers.

Once the driver implements the advisory action, the controller 32 calculates the likelihood of arriving at the destination under the advisory action, as represented by block 150. Hopefully the likelihood has increased and the driver can continue to the destination under the advisory actions.

Once the vehicle implements the mandatory actions, the controller 32 calculates the likelihood of arriving at the destination or any charging station, as represented by block 154. Again, the likelihood should have increased so that the driver can continue to the destination or a charging station under the mandatory action or a combination of advisory actions and mandatory actions.

The controller 32 communicates with the user through the information interface system 58. As previously discussed, the interface system 58 may also include an information display, input buttons or keys, an audio system and a voice recognition system for providing information and receiving inputs from the driver.

References to the controller 32 may correspond generally to any number of vehicle controllers or vehicle associated computing systems capable of performing the methods described herein. As previously described, the controller 32 may include a VSC/PCM, vehicle control unit, motor control unit, display control unit or a remote computing system in communication with the a vehicle control unit, or the like. It should also be noted that the methods described in FIG. 2 and FIG. 3 are only examples, and that the functions or steps of the method could be undertaken other than in the order described and/or simultaneously as may be desired, permitted and/or possible.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. An interface system for an electric vehicle, the system comprising:
    an interface for communicating with a vehicle user; and
    a controller in communication with the interface and configured to:
        receive input indicative of a destination;
        calculate a likelihood of arriving at the destination based on vehicle data and a present location;
        compare the likelihood of arriving to at least a first threshold and a second threshold;
        implement a first action when the likelihood of arriving is less than at the first threshold and greater than the second threshold; and
        implement a second action, different from the first action, when the likelihood of arriving is less than the second threshold, the second action automatically adjusting at least one vehicle operating parameter to reduce energy consumption.

2. The system of claim 1, wherein the first action includes communicating an advisory action via the interface to be executed by the vehicle user.

3. The system of claim 1 wherein the first action includes communicating an advisory action message via the interface to be executed by the vehicle user, wherein the advisory action message advises the user to take an alternate route including at least one of a more direct route and a least-energy route.

4. The system of claim 1 wherein the controller is further configured to implement a third action being different from the first and second actions, when the likelihood of arriving is less than a third threshold, wherein the third action is automatically executed by the controller.

5. An electric-vehicle system comprising:
    a controller configured to:
        calculate a likelihood of arriving at a destination based on vehicle data and a current location;
        compare the likelihood to at least first and second thresholds;
        implement a first action when the likelihood is less than the first threshold and greater than the second threshold; and
        implement a different second action to automatically adjust vehicle operating parameters to reduce energy consumption when the likelihood is less than the second threshold.

6. The system of claim 5 wherein the first action includes communicating an advisory action to be executed by a vehicle user.

7. The system of claim 5 wherein the first action includes communicating an advisory action message, via an interface, to be executed by a vehicle user, wherein the advisory action message advises the user to take an alternate route including at least one of a more direct route and a least-energy route.

8. The system of claim 5 wherein the vehicle operating parameter includes at least one a maximum vehicle speed or a vehicle accessory level.

9. The system of claim 5 wherein the vehicle data at least includes a battery charge level and the controller is further configured to calculate the likelihood of arriving at a destination based on route data including at least one of traffic, weather, and terrain data.

10. The system of claim 5 wherein the controller is further configured to implement a third action being different from the first and second actions, when the likelihood of arriving is less than a third threshold, wherein the third action is automatically executed by the controller.

11. The system of claim 10 wherein the third action includes at least one of setting an alternate destination and locating a rescuer.

12. A vehicle control method comprising:
    calculating a likelihood of arriving at a destination based on vehicle data and a current location;
    comparing the likelihood to at least first and second thresholds;
    implementing a first action when the likelihood is less than the first threshold and greater than the second threshold; and
    implementing a different second action to automatically adjust vehicle operating parameters to reduce energy consumption, when the likelihood is less than the second threshold.

13. The method of claim 12 wherein the first action includes communicating an advisory action to be executed by a vehicle user.

14. The method of claim 12 wherein the first action includes communicating an advisory action message via an interface to be executed by a vehicle user, wherein the advisory action message advises the user to take an alternate route including at least one of a more direct route and a least-energy route.

15. The method of claim 12 wherein adjusting the vehicle operating parameter includes as least one of reducing a maximum vehicle speed or reducing a vehicle accessory level.

16. The method of claim 12 further comprising implementing a third action being different from the first and second actions when the likelihood of arriving is less than a third threshold, the third action being automatically executed by the vehicle, and including at least one of setting an alternate destination and locating a rescuer.

17. The method of claim 12 further comprising calculating the likelihood of arriving at the destination after implementing one of the first action or the second action.

* * * * *